United States Patent [19]

Krawagna

[11] Patent Number: 4,982,866
[45] Date of Patent: Jan. 8, 1991

[54] A BI-STABLE HINGE UNIT OF ELASTIC MATERIAL

[75] Inventor: Louis A. Krawagna, Toronto, Canada

[73] Assignee: Firma Creanova AG, Zurich, Switzerland

[21] Appl. No.: 315,415

[22] Filed: Feb. 23, 1989

[30] Foreign Application Priority Data

Mar. 7, 1988 [GB] United Kingdom ............... 8805380

[51] Int. Cl.$^5$ .............................................. B65D 51/18
[52] U.S. Cl. .................................... 220/335; 220/339; 16/227
[58] Field of Search .......................... 16/227, DIG. 13; 220/335, 339

[56] References Cited

U.S. PATENT DOCUMENTS 4,403,712 9/1983 Wiesinger ............................. 16/227

FOREIGN PATENT DOCUMENTS 056469 6/1985 European Pat. Off. .

Primary Examiner—Richard K. Seidel
Assistant Examiner—Carmine Cuda
Attorney, Agent, or Firm—Hubbard, Thurman, Turner, Tucker & Harris

[57] ABSTRACT

A bi-stable hinge unit (10) of elastic material connects two inflexible end portions (12, 13) to take up two stable positions on either side of an intermediate unstable position. The hinge unit (10) comprises two equal elements (14, 15), each of which having two cantilever arms (18, 20), linked to each other by two folding lines (22) acting as a "living" hinge. A triangular rigid plate (16) is arranged between and defined by said folding lines (22). The elements (14, 15) are arranged substantially parallel to each other with a distance therebetween and forming the main hinge line between said end portions (12, 13). By swinging the end portions (12, 13) toward each other along the main hinge line, the four cantilever arms (18, 20) will start to deflect and act as springs and the two triangular plates (16) will rotate through approximately 180° in a plane normal to the elements (14, 15).

18 Claims, 9 Drawing Sheets

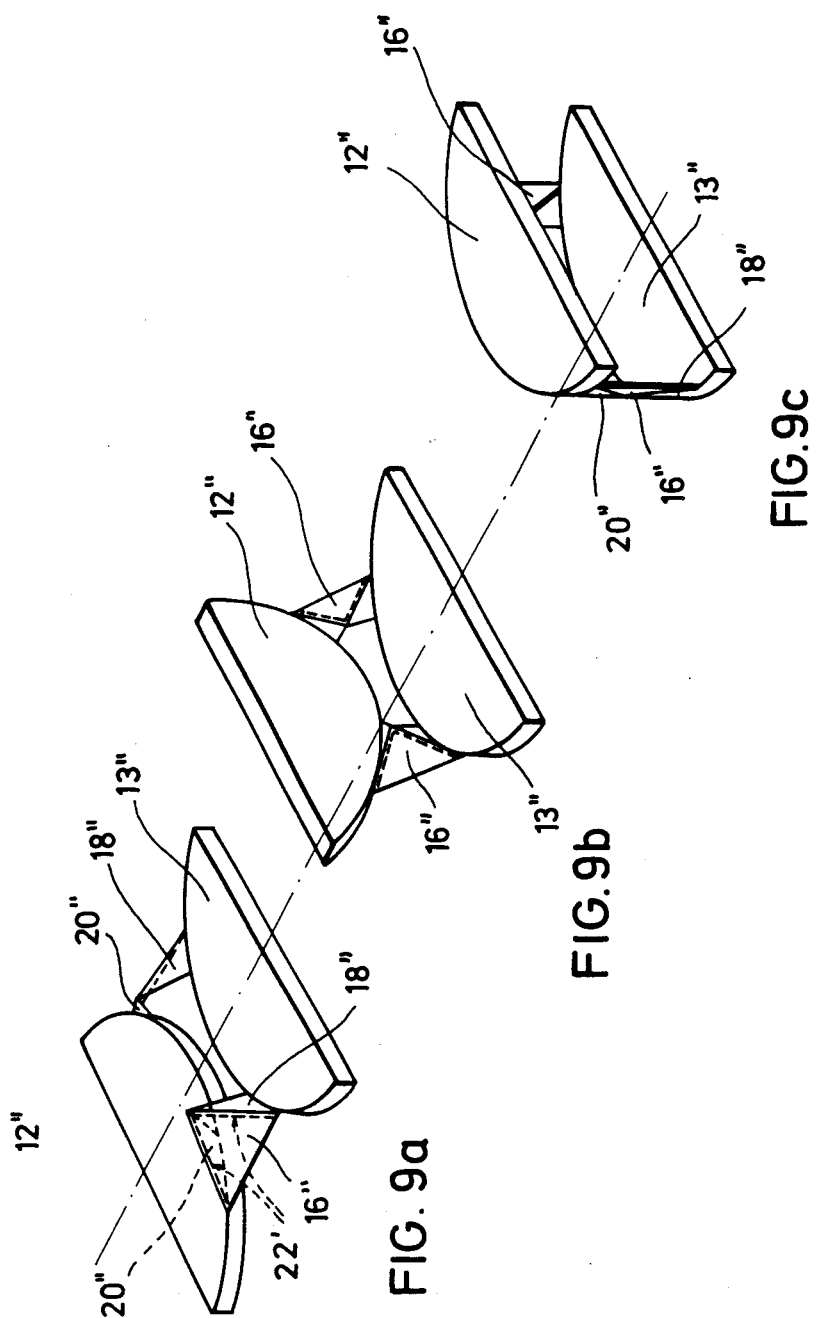

A BI-STABLE HINGE UNIT OF ELASTIC MATERIAL

The invention relates to a bi-stable hinge unit of elastic material connecting two relatively inflexible end portions to take up two stable positions on either side of an intermediate unstable position.

Prior art bi-stable hinge units (EP-B-No. 056 469) are used as a one-piece snap-hinge of plastic material for the connection of a container with its closure cap. In the one stable position, the closure cap is in its opening position whereas, in the other stable position of the hinge unit, the closure cap is in its closing position.

It is the object of the invention to improve a bi-stable hinge unit such that its manufacture, in particular by molding, can be facilitated, molds used for manufacturing can be simplified and the hinge unit per se has a further extended lifetime.

In a bi-stable hinge unit, said object is solved in accordance with the invention in that said hinge unit comprises two equal elements, each of which having two cantilever arms linked to each other by two folding lines and a substantially triangular relatively rigid plate arranged between and defined by said folding lines, and that said elements are arranged substantially parallel to each other with a distance therebetween and forming the main hinge line between said end portions, by folding along said main hinge line the four cantilever arms will start to deflect and act as springs and the two triangular plates will rotate through approximately 180° in a plane normal to the elements.

The bi-stable hinge unit according to the present invention typically has two relatively inflexible end portions which are joined together by two flexible bridging structures that are spaced apart and form the two elements. Each bridging structure has a somewhat triangular central portion or plate which is connected through folding lines acting as flexible or "living" hinges with two further triangular portions or cantilever arms, being connected to the respective end portions. When the end portions flex toward each other, the central triangular plates rotate through approximately 180° in a plane normal to the bridging portions and, at the same time, the cantilever arms of each bridging structure distort inwardly to allow the inversion of the central triangular plate.

Several embodiments of this invention are illustrated in the accompanying drawings, in which like numerals denote like parts throughout the several views, and in which:

FIGS. 9a to 9c are perspective views of a still further embodiment of the invention in the open stable position, the intermediate unstable position and the closed stable position, respectively.

Figure 1:
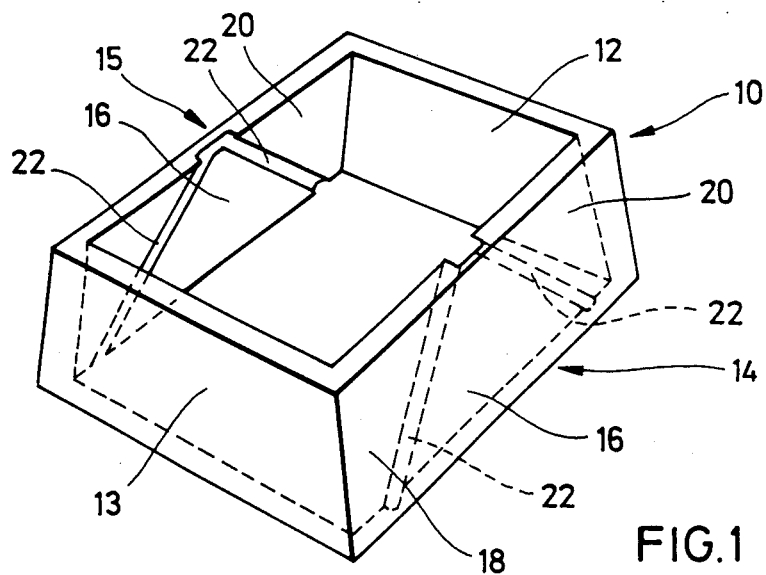
FIGS. 1, 2 and 3 are perspective views of a first embodiment of this invention in the open stable position, the intermediate unstable position and the closed stable position, respectively.
Figure 2:
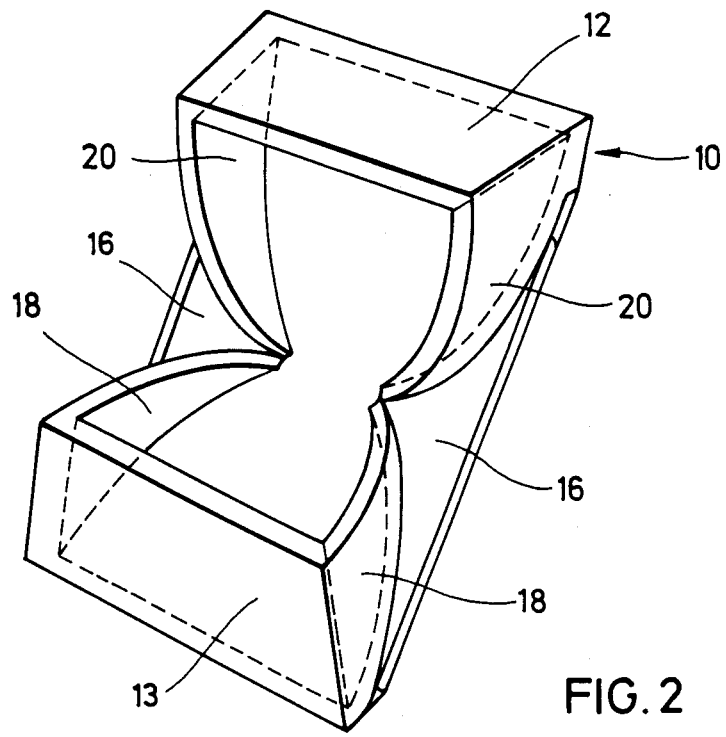
Figure 3:
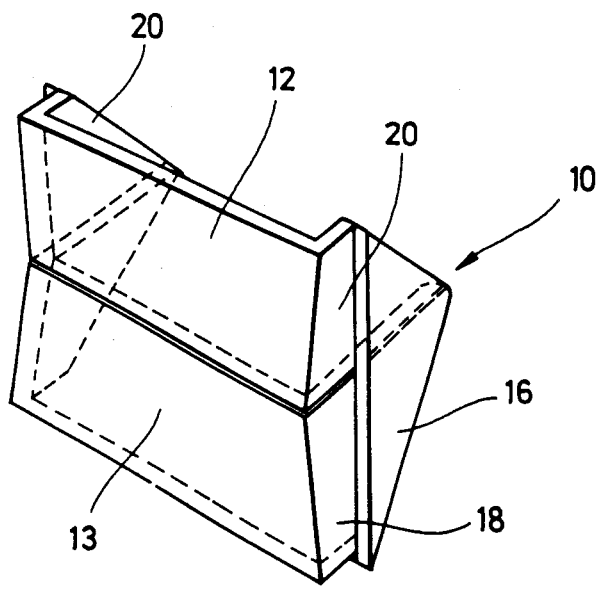

As shown in FIGS. 1, 2 and 3, a bi-stable hinge 10 consists of a first rigid element 12, a second rigid element 13, and two equal elements acting as flexible bridging structures 14 and 15. As best seen in FIG. 1, each element 14 and 15 consists of a central triangular plate 16 which is centrally located, and two cantilever arms forming end triangular portions 18 and 20. Each central triangular plate 16 is connected to its respective cantilever arm 18 and 20 by integral folding lines acting as "living" hinges 22. As can be seen by comparing FIGS. 1 and 2, as the end structures 12 and 13 swing toward each other, the cantilever arms 18 and 20 undergo distortion, particularly inward distortion at their inner ends, to allow the central triangular plates 16 to begin to invert or reverse their orientations. More specifically, the triangular plates 16 rotate about an axis substantially parallel with the main direction of the elements 14 and 15, so that rotation takes place in a plane transverse to the main direction of the elements 14 and 15. In FIG. 2, the intermediate triangular plates 16 have rotated through approximately 90° so that they now lie in approximately the same plane. Further movement of the end portions 12 and 13 toward each other, to achieve the configuration shown in FIG. 3, requires the intermediate triangular plates 16 to continue to rotate until they are fully inverted and lie in parallel relation against the respective cantilever arms 18 and 20. As seen in FIG. 3, in this configuration, the end elements 12 and 13 are at the closest approach to each other. During the movement from FIG. 2 to FIG. 3, the cantilever arms 18 and 20 return from their distorted position of FIG. 2 to substantially the same position as they held in FIG. 1. Thus, FIGS. 3 and 1 represent stable positions, whereas FIG. 2 represents an intermediate unstable position.

Figure 4A:
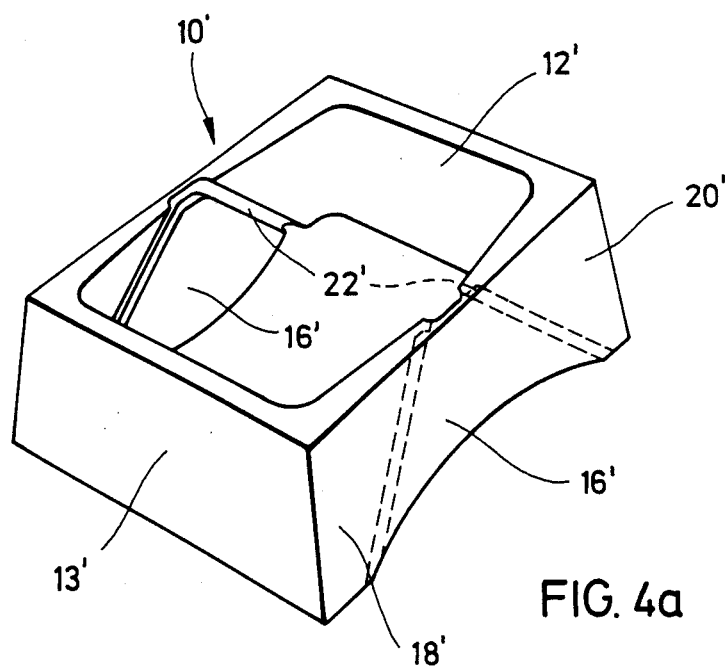
FIGS. 4a to 4c are perspective views of a second embodiment of this invention in the open stable position, the intermediate unstable position and the closed stable position, respectively.
Figure 4B:
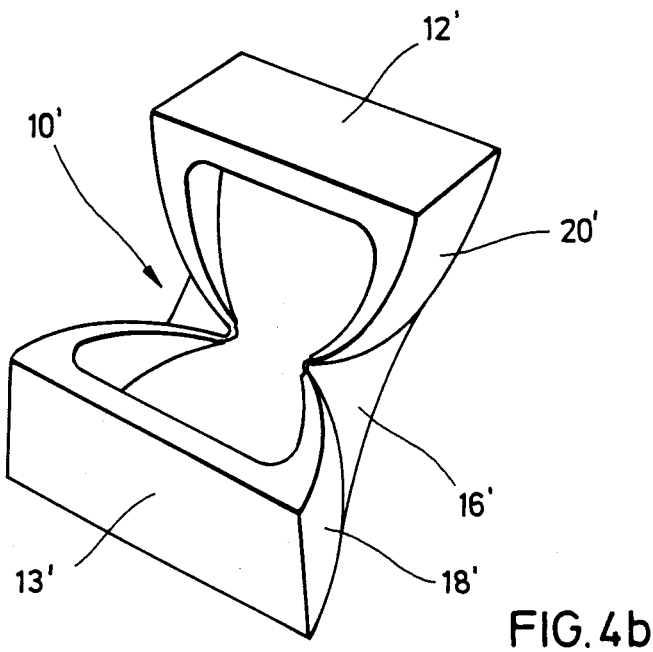
Figure 4C:
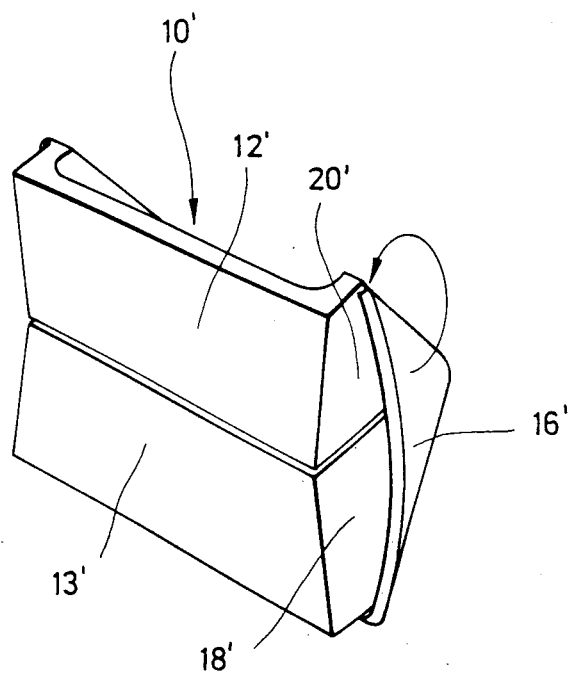

FIGS. 4a, 4b and 4c represent a slightly different configuration of a bi-stable hinge unit 10' which functions essentially identically to the one as described with respect to FIGS. 1 to 3. In this configuration, the central triangular plate 16' has a conical shape whereby it will act as an additional spring means and thus reduce the deflection of the cantilever arms 18' and 20'. The remaining elements are constructed and operate in the same manner as shown and explained in connection with FIGS. 1 to 3. These elements are designated with the same reference numerals associated by a prime. Consequently, it is not necessary to describe the configuration or movement of the various elements in this embodiment.

Figure 5A:
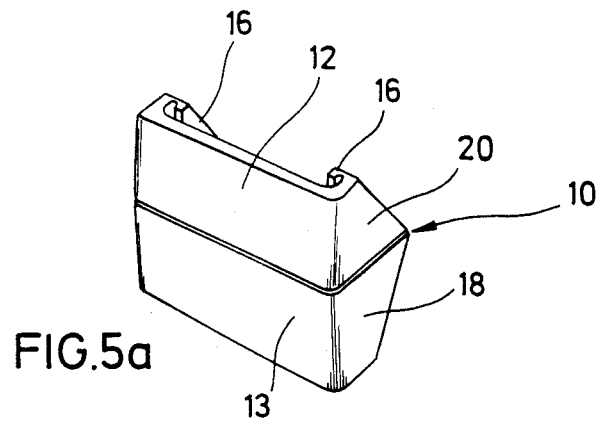
FIGS. 5a and 5b are perspective views of a third embodiment of this invention in the closed and opened position, respectively.
Figure 5B:
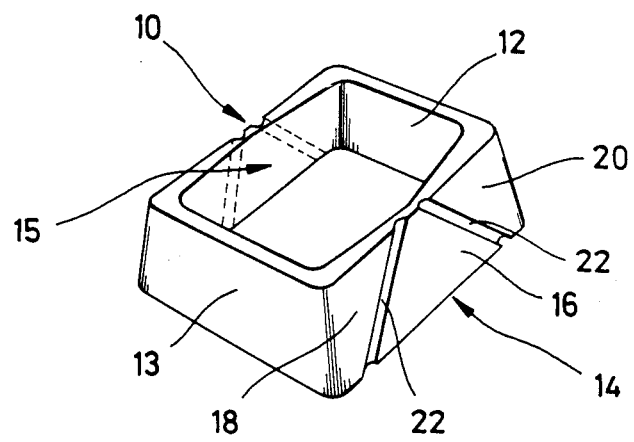

FIGS. 5a and 5b show a third embodiment of the hinge unit 10 in which the folding lines are provided in the form of recesses at the outer surfaces of the elements 14 and 15. Due to this construction of the folding lines 22, the triangular plate 16 is folded onto the inner surfaces of the cantilever arms 18 and 20, as it is shown in FIG. 5a.

When comparing this embodiment with the embodiments as shown in FIGS. 1 to 4, it should be noted that, in the first and second embodiment, the folding lines 22 and 22′ are formed as recesses at the inner surfaces of the elements 14 and 15 and, therefore, the triangular portion 16 and 16′ is folded onto the outer surface of the cantilever arms 18, 20 and 18′, 20′, respectively.

In order to facilitate folding of the triangular plate 16 or 16′ onto the outer or inner surfaces of the cantilever arms 18, 20 and 18′, 20′, respectively, the plane of the elements 14 and 15 can be slightly inclined with respect to the vertical plane. This inclination is performed in the direction of converging the tips of the triangular plates 16 and 16′ of the elements 14, 15, if the recesses of the folding lines 22, 22′ are formed at the inner surfaces of the elements 14, 15. This inclination is performed in the direction of diverging the tips of the triangular plates 16 and 16′ of the elements 14, 15 if the recesses of the folding lines 22, 22′ are formed at the outer surfaces of the elements 14, 15.

Figure 6A:
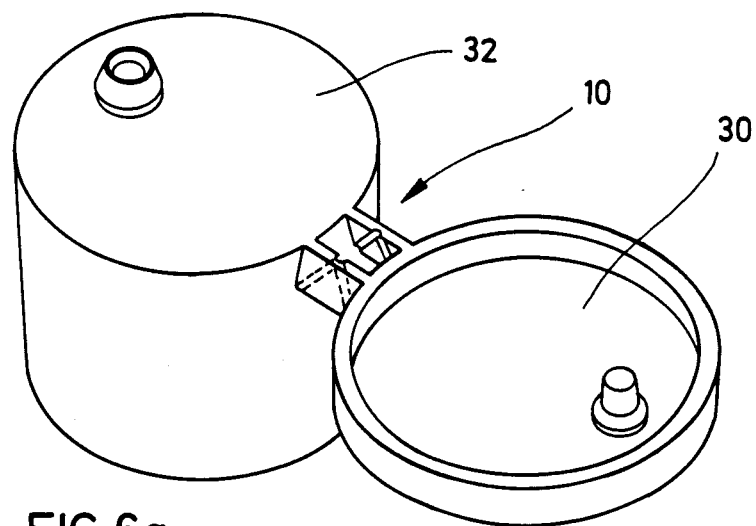
FIGS. 6a and 6b are perspective views of a container and cap connected together by the bi-stable hinge of the present invention, in the open and closed positions, respectively.
Figure 6B:
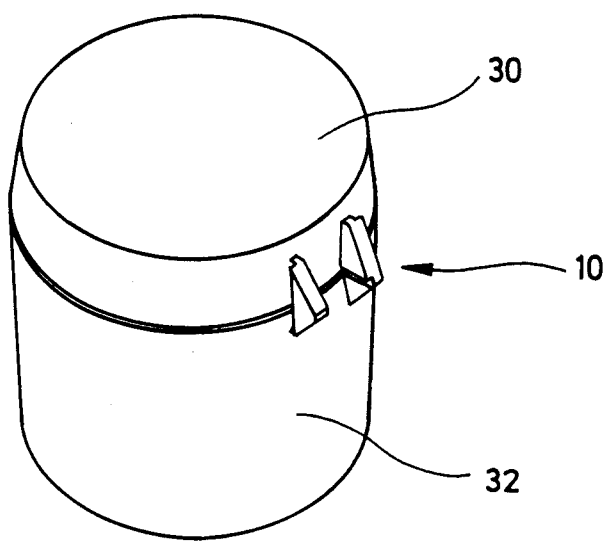

FIGS. 6a and 6b show in perspective view the employment of the bi-stable hinge unit 10 in connecting a lid or cap 30 to a container 32.

Figure 7A:
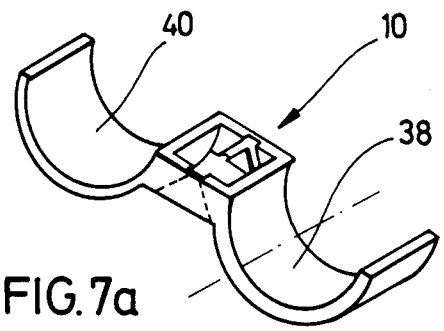
FIGS. 7a and 7b are perspective views of an annular ring consisting of two halves connected together by the bi-stable hinge of this invention, in the open and closed positions, respectively.
Figure 7B:
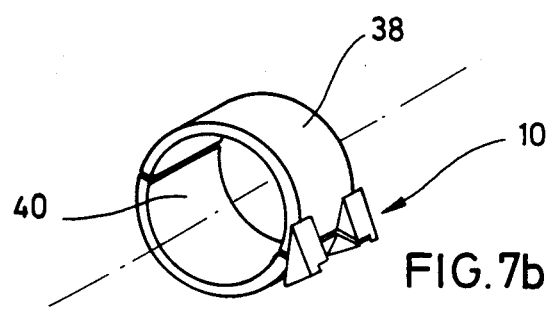

FIGS. 7a to 7b illustrate a similar use of the bi-stable hinge unit, which is shown at 10 between two semicylindrical portions 38 and 40 which can be brought together to form a ring or tube, as illustrated in FIG. 7b.

Figure 8:
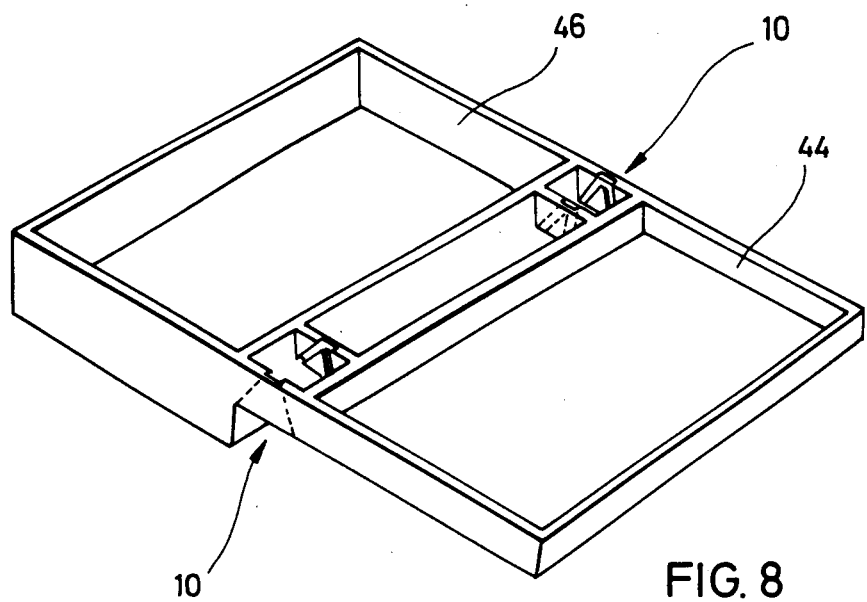
FIG. 8 is a perspective view of a box, in the open position, having a lid or cover hinged to the main box by the bi-stable hinge of this invention.

FIG. 8 shows the use of two identical bi-stable hinge units 10 to hingingly connect a cover or lid 44 to a box 46.

FIGS. 9a, 9b and 9c show a further and somewhat different embodiment of the bi-stable hinge unit comprising first and second rigid elements 12″ and 13″, which are connected by two equal bridge structure elements having cantilevers 18″ and 20″ and a central triangular plate 16″ similar to the foregoing embodiments. As shown in particular in FIG. 9a, in the stable open position of the hinge unit, the cantilevers 18″, 20″ and the triangular plate 16″ form a pyramid-shaped structure and the rigid elements or end portions 12″ and 13″ are oriented in a same first plane.

As can be seen by comparing FIGS. 9a, 9b and 9c, as the end portions 12″ and 13″ swing toward each other, the cantilever arms 18″ and 20″ undergo distortion, particularly inward distortion at their inner ends, to allow the central triangular plates 16″ to begin to invert or reverse their orientations. In the closed and stable position as shown in FIG. 9c, the end portions 12″ and 13″ are oriented one over another in two parallel planes, wherein end portion 13″ maintain its orientation in the first plane. In this closed position, cantilever arms 18″, 20″ and the triangular plate 16″ are aligned in a same and second plane which is substantially normal to the first plane.

Figure 10A:
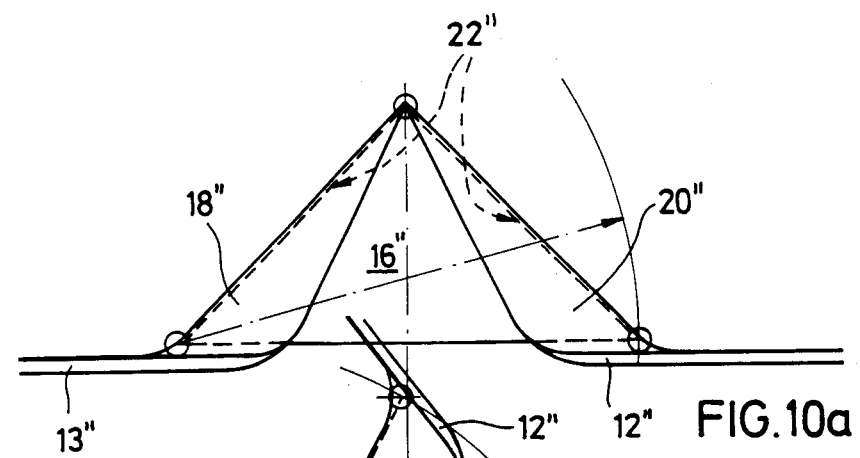
FIGS. 10a to 10c are schematic diagrams showing the operation of the embodiment as shown in FIGS. 9a to 9c.
Figure 10B:
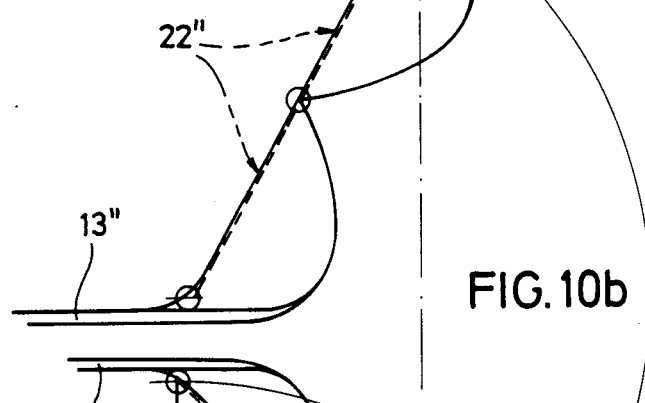
Figure 10C:
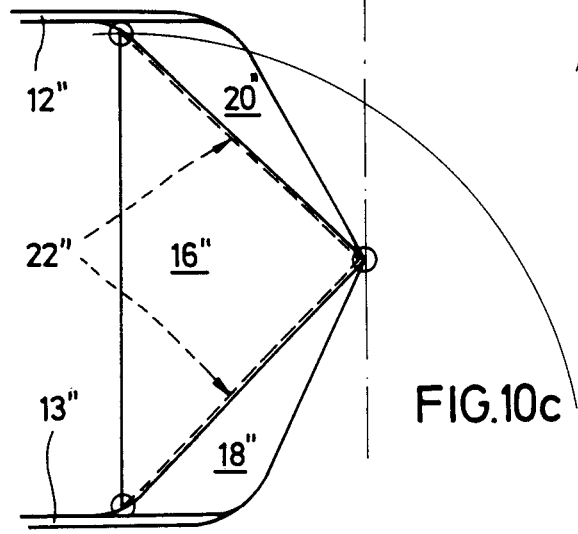

FIGS. 10a, 10b and 10c, corresponding to FIGS. 9a, 9b and 9c show schematically the orientations and deflection of the cantilever arms 18″, 20″ and the movement of the triangular plate 16″ when swinging the end portion 12″ toward the end portion 13″.

Naturally, all the different embodiments as shown in the drawings can be used in connection with the examples as shown in FIGS. 6 to 8.

The substantially triangular plate (16, 16′, 16″) controls the opening range of the hinge.

If the angle of the triangular plate (16, 16′, 16″) is smaller than 90°, the open to close range will be theoretically larger.

This situation can be used to provide a spring force even in the closed position of the hinge unit.

A larger than 90° angle of the triangular plate (16, 16′, 16″) will have a less than 180° open to close range.

Although not shown in the drawings, the bi-stable hinge unit of the invention is also applicable to the cartonage industry, whereby the hinge lines can be formed by a scoring and folding technique. That means the folding lines of the hinge unit are formed by scoring cardboard in order to form a carton or parts of a carton by folding along said main hinge line.

I claim:

1. A bi-stable hinge unit (10) of elastic material connected two substantially inflexible end portions (12, 13) to take up two stable positions on either side of an intermediate unstable position, characterized in that said hinge unit (10) comprises two equal elements (14, 15), each of which having two cantilever arms (18, 20) linked to each other by two folding lines (22) and a substantially triangular substantially rigid plate (16) arranged between and defined by said folding lines (22), and that said elements (14, 15) are arranged substantially parallel to each other with a distance therebetween and forming the main hinge line between said end portions (12, 13), by folding along said main hinge line the four cantilever arms (18, 20) will start to deflect and act as springs and the two triangular plates (16) will rotate through approximately 180° in a plane normal to the elements (14, 15).

2. Hinge unit according to claim 1, wherein said triangular plates (16′) have a conical shape whereby they act as additional spring means for reducing the deflection of the cantilever arms (18′, 20′).

3. Hinge unit according to claim 1 wherein said folding lines (22) are formed by recesses within one of the surfaces of each of the elements (14, 15).

4. Hinge unit according to claim 3, wherein, when said recesses (22) are formed at the inner surfaces of the elements (14, 15), facing to one another, said triangular plates (16), during their rotation, are folded onto the outer surfaces of the cantilever arms (18, 20).

5. A bi-stable hinge unit (10) of elastic material connected two substantially inflexible end portions (12, 13) to take up two stable positions on either side of an intermediate unstable position, characterized in that;

said hinge unit (10) comprises two equal elements (14, 15), each of which having two cantilever arms (18, 20) linked to each other by two folding lines (22) and a substantially triangular substantially rigid plate (16) arranged between and defined by said folding lines (22), said folding lines (22) are formed by recesses within one of the surfaces of each of the elements (14, 15), said recesses (22) being formed at the outer surfaces of the elements (14, 15), and that said elements (14, 15) are arranged substantially parallel to each other with a distance therebetween and forming the main hinge line between said end portions (12, 13), by folding along said main hinge line the four cantilever arms (18, 20) will start to deflect and act as springs and the two triangular plates (16) will rotate through approximately 180° in a plane normal to the elements (14, 15) to fold onto the inner surfaces of the cantilever arms (18, 20).

6. Hinge unit according to claim 2, wherein said folding lines (22) are formed by recesses within one of the surfaces of each of the elements (14, 15).

7. Hinge unit according to claim 6, wherein it is integrally molded from a plastic material.

8. Hinge unit according to claim 4, wherein, when said recesses (22) are formed at the inner surfaces of the elements (14, 15), facing to one another, said triangular plates (16), during their rotation, are folded onto the outer surfaces of the cantilever arms (18, 20).

9. Hinge unit according to claim 8, wherein it is integrally molded from a plastic material.

10. Hinge unit according to claim 5, wherein said triangular plates (16) are curved to form a conical shape whereby they act as additional spring means for reducing the deflection of the cantilever arms (18, 20).

11. Hinge unit according to claim 10, wherein it is integrally molded from a plastic material.

12. Hinge unit according to claims 1 to 5, wherein it is integrally molded from a plastic material.

13. Hinge unit according to any of claims 1 to 5, wherein said cantilever arms (18, 20) and triangular plate (16) of each element (14, 15) comprise flexible bridging structure in a first stable position of said hinge unit (10), separating said two each portions (12, 13) spaced apart from each other, wherein said two end portions (12, 13) are oriented adjacent to one another and said triangular plate (16) is folded onto said cantilever arms (18, 20) in the second stable position of said hinge unit (10).

14. Hinge unit according to claim 8, wherein said end portions (12, 13) are secured to or are integral with peripheral walls of the two halves (38, 40) of a ring-shaped structure.

15. Hinge unit according to claim 13, wherein said end portions (12, 13) are secured to or are integral with peripheral walls of a cylindrical container (32) or a rectangular box (46) and an associated closure cap (30) or cover (44), respectively.

16. Hinge unit according to any of claims 1 to 5, wherein said cantilever arms (18″, 20″) and triangular plate (16″) of each element (14″, 15″) are forming a pyramid when, in a first stable position of said hinge unit (10″), said two end portions (12″, 13″) are oriented in substantially a same first plane and said cantilever arms (18″, 20″) and triangular plate (16″) are aligned in substantially a same second plane substantially normal to the first plane when, in the second stable position of said hinge unit (10″), said two end portions (12″, 13″) are oriented parallel to each other in different planes, one of which is the first plane in the first stable position.

17. Hinge unit according to claim 11, wherein said end portions (12, 13) are secured to or are integral with peripheral walls of the two halves (38, 40) of a ring-shaped structure.

18. Hinge unit according to claim 16, wherein said end portions (12, 13) are secured to or are integral with peripheral walls of a cylindrical container (32) or a rectangular box (46) and an associated closure cap (30) or cover (44), respectively.

* * * * *